(12) United States Patent
Mak

(10) Patent No.: US 8,892,043 B2
(45) Date of Patent: Nov. 18, 2014

(54) METHOD AND SYSTEM FOR OPTIMIZING DATA THROUGHPUT IN A BLUETOOTH COMMUNICATION SYSTEM

(71) Applicant: Broadcom Corporation, Irvine, CA (US)

(72) Inventor: Siukai Mak, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/071,091

(22) Filed: Nov. 4, 2013

(65) Prior Publication Data

US 2014/0056170 A1 Feb. 27, 2014

Related U.S. Application Data

(63) Continuation of application No. 11/670,145, filed on Feb. 1, 2007, now Pat. No. 8,577,291.

(51) Int. Cl.
*H04B 7/00* (2006.01)
*H04W 24/08* (2009.01)
*H04L 1/20* (2006.01)

(52) U.S. Cl.
CPC .............. *H04W 24/08* (2013.01); *H04L 1/203* (2013.01)
USPC ........................................................ 455/41.2

(58) Field of Classification Search
CPC ............................. H04W 84/18; H04M 1/7253
USPC ........................................................ 455/41.2
See application file for complete search history.

(56) References Cited

U.S. PATENT DOCUMENTS

| | | | | |
|---|---|---|---|---|
| 6,430,395 B2 * | 8/2002 | Arazi et al. | ................... | 455/41.2 |
| 6,836,862 B1 * | 12/2004 | Erekson et al. | ................... | 714/704 |
| 7,076,378 B1 * | 7/2006 | Huebner | ......................... | 702/69 |
| 7,283,579 B2 * | 10/2007 | Higgins, Jr. | ................... | 375/133 |
| 7,389,088 B2 * | 6/2008 | Kim | ............................. | 455/41.1 |
| 7,499,717 B2 * | 3/2009 | Arazi et al. | ................... | 455/462 |
| 7,574,175 B2 * | 8/2009 | Ibrahim et al. | ............... | 455/41.2 |
| 7,697,897 B2 * | 4/2010 | Duerdodt et al. | ........... | 455/63.1 |
| 2002/0105925 A1 * | 8/2002 | Shoemake | ..................... | 370/330 |
| 2002/0132630 A1 * | 9/2002 | Arazi et al. | ................... | 455/502 |
| 2004/0009749 A1 * | 1/2004 | Arazi et al. | ................... | 455/41.2 |
| 2004/0242258 A1 * | 12/2004 | Kim | ............................ | 455/522 |
| 2004/0258135 A1 * | 12/2004 | Higgins, Jr. | ................... | 375/132 |
| 2005/0111485 A1 * | 5/2005 | Bruckmann et al. | .......... | 370/465 |
| 2006/0084382 A1 * | 4/2006 | Ibrahim et al. | ............... | 455/41.2 |
| 2007/0066227 A1 * | 3/2007 | Duerdodt et al. | ........... | 455/63.1 |
| 2007/0147330 A1 * | 6/2007 | Smith et al. | ................... | 370/346 |
| 2007/0147332 A1 * | 6/2007 | Lappetelainen et al. | ...... | 370/346 |
| 2007/0270098 A1 * | 11/2007 | Chen et al. | ................... | 455/41.2 |

* cited by examiner

*Primary Examiner* — April G Gonzales
(74) *Attorney, Agent, or Firm* — Oblon, Spivak, McClelland, Maier & Neustadt, L.L.P.

(57) ABSTRACT

A method and system for optimizing data throughput in a Bluetooth communication system is provided. The method may include determining the bit error rate (BER) of a first Bluetooth packet type of a plurality of Bluetooth packet types transmitted at a first power output level by a Bluetooth transmitter and selecting a second packet type from the plurality of Bluetooth packet types in response to determining the bit error rate. The different packet types may comprise DM1, DM3, DM5, DH1, DH3, DH5, HV1, HV2, HV3, 2DH1, 2DH3, 2DH5, 3DH1, 3DH3, and 3DH5 Bluetooth packets. The method may also include estimating the BER from the packet error rate (PER) of the first Bluetooth packet type, where the PER may be computed by comparing a number of packets of said first Bluetooth packet type with good CRCs to a number of packets of said first Bluetooth packet type with bad CRCs.

20 Claims, 13 Drawing Sheets

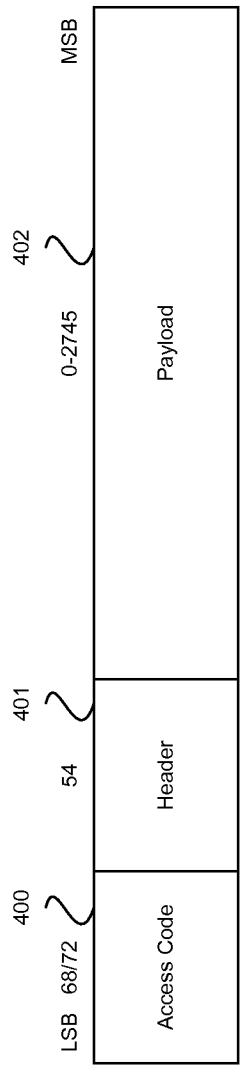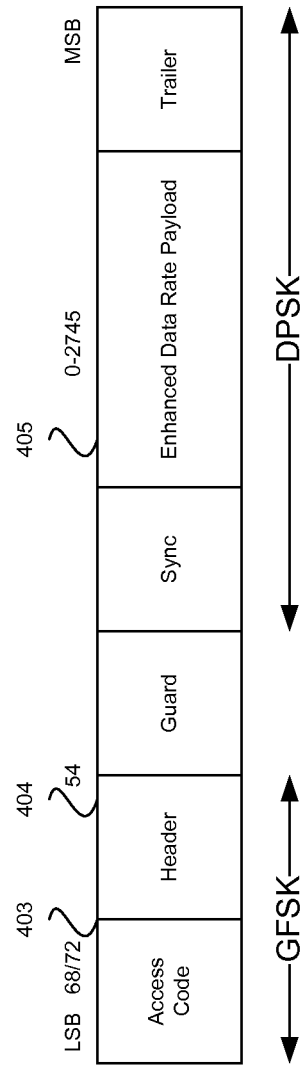
Fig. 4A
Fig. 4B

METHOD AND SYSTEM FOR OPTIMIZING DATA THROUGHPUT IN A BLUETOOTH COMMUNICATION SYSTEM

CROSS-REFERENCE TO RELATED APPLICATIONS/INCORPORATION BY REFERENCE

This application is a continuation of co-pending U.S. patent application Ser. No. 11/670,145 filed on Feb. 1, 2007, which is hereby incorporated by reference in its entirety.

FIELD OF THE INVENTION

Certain embodiments of the invention relate to Bluetooth communication. More specifically, certain embodiments of the invention relate to a method and system for optimizing data throughput in a Bluetooth communication system.

BACKGROUND OF THE INVENTION

As competition in the mobile device business has increased, manufacturers of mobile devices may have found themselves struggling to differentiate their respective products. Although mobile device styling may have been the preferred way of attracting consumers, manufacturers are increasingly turning to adding more features. For example, at one time a cellular telephone was only used for voice communication. But today, cellular telephones may be more akin to computers. Many run familiar applications such as email applications. In this regard, many of these cellular telephones include address book functionality, which may, for example, be synchronized with a computer. In addition, some cellular telephones include hardware and software to support hands-free capability.

To support the synchronization capability, the hands free capability, and a whole host of other capabilities, many mobile devices include a Bluetooth communication system. In a Bluetooth communication system, information may be wirelessly communicated via packets of data. There are many different types of packets that may be utilized and each may have its advantages and disadvantages.

Some of the packet formats may support higher data rates than others, while others may include various data integrity protection schemes. In this regard, packets including data integrity protection may perform better when the channel quality is poor. This may, however, come at the expense of decreased information throughput. Other packets may forgo the data protection schemes so as to increase the amount of information that may be communicated. These packets, however, may not perform well when the channel quality is poor.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for optimizing data throughput in a Bluetooth communication system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4A is a block diagram of an exemplary basic data rate (BDR) packet, which may be utilized in connection with an embodiment of the invention.

FIG. 4B is a block diagram of an exemplary extended data rate packet, which may be utilized in connection with an embodiment of the invention.

DETAILED DESCRIPTION OF THE INVENTION

Certain embodiments of the invention may be found in a method and system for optimizing data throughput in a Bluetooth communication system. The method may include determining the bit error rate (BER) of a first Bluetooth packet type of a plurality of Bluetooth packet types transmitted at a first power output level by a Bluetooth transmitter, and selecting a second packet type from the plurality of Bluetooth packet types in response to determining the bit error rate. The different packet types may comprise DM1, DM3, DM5, DH1, DH3, DH5, HV1, HV2, HV3, 2DH1, 2DH3, 2DH5, 3DH1, 3DH3, and 3DH5 Bluetooth packets. The method may also include estimating the BER from the packet error rate (PER) of the first Bluetooth packet type, where the PER may be computed by comparing a number of packets of said first Bluetooth packet type with good CRCs to a number of packets of said first Bluetooth packet type with bad CRCs.

The method may also include reducing the power output level of the Bluetooth transmitter when the first Bluetooth packet provides the maximum data throughput of the plurality of Bluetooth packet types, selecting from the plurality of Bluetooth packet types a packet that provides a higher data throughput when the output power level of the Bluetooth transmitter is at a minimum level, increasing the power output level of the Bluetooth transmitter when the first Bluetooth packet provides the minimum data throughput of the plurality of Bluetooth packet types, and selecting from the plurality of Bluetooth packet types a packet that provides a minimum data throughput when the output power level of the Bluetooth transmitter is at a maximum level.

Figure 1:
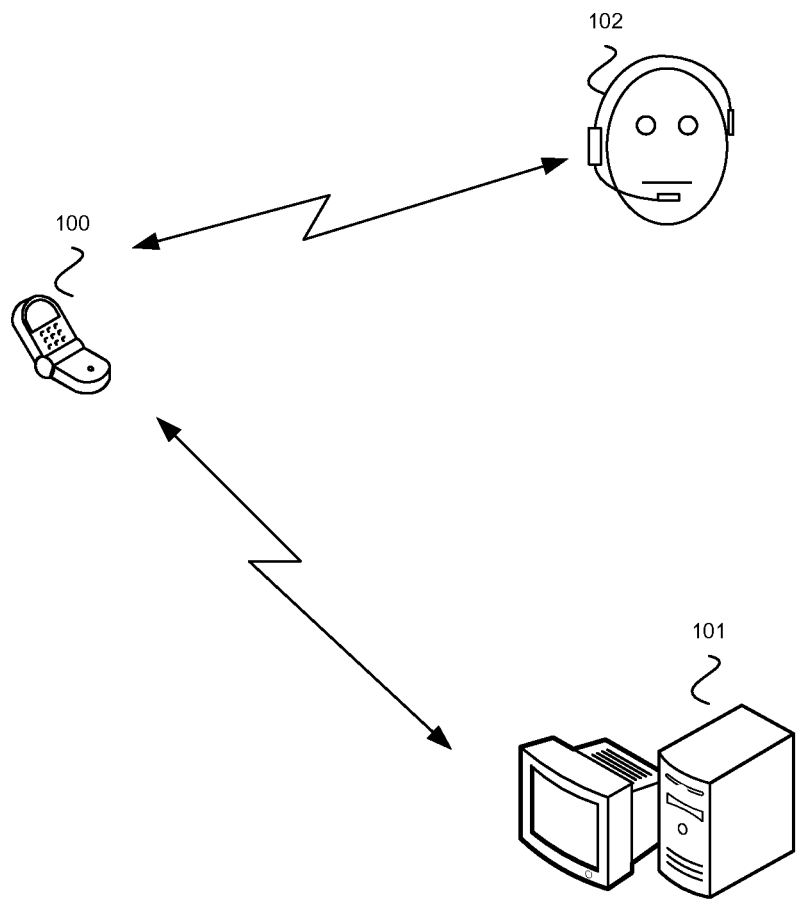
FIG. 1 is a block diagram of exemplary Bluetooth communication between several devices, which may be utilized in connection with an embodiment of the invention.

FIG. 1 is a block diagram of exemplary Bluetooth communication between several devices, which may be utilized in connection with an embodiment of the invention. Referring to FIG. 1, there is shown a mobile device 100, a computer 101, and a headset 102. The mobile device 100, computer 101 and headset 102, may comprise suitable logic, circuitry and/or code that may enable establishment of a Bluetooth connection. In this regard, the mobile device may establish a Bluetooth link with the headset. In this case, the mobile device may be the master and the headset may be the slave. The communication between the mobile device and the headset may comprise voice information and may utilize 2 timeslots, where 1 timeslot may be utilized for uplink communication and the other may be utilized for downlink communication.

The mobile device 100 may also establish a Bluetooth link with the computer 101 as well. In this case, the computer 101 may be the master and the mobile device 100 may be the slave. The communication between the mobile device and the computer 101 may comprise data communication. For example, a user may wish to synchronize an address book on the computer 101 with the address book in the mobile device 100. In the case of data traffic, the communication between the mobile device 100 and computer 101 may utilize 1 or more timeslots. This may enable greater throughput of data.

Figure 2:
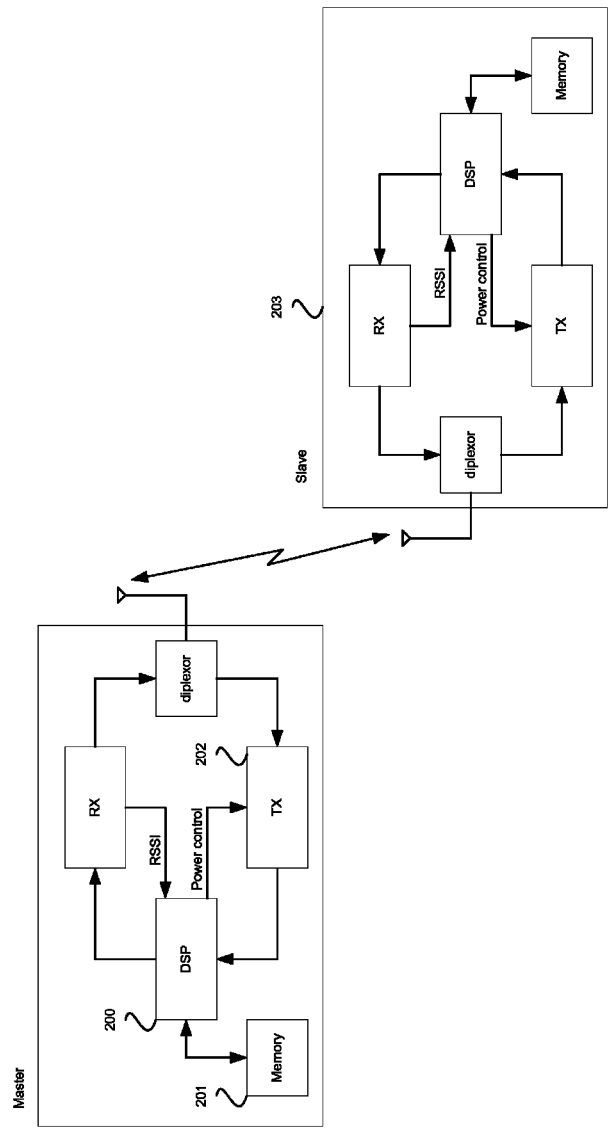
FIG. 2 is a block diagram of an exemplary master and slave utilizing a Bluetooth communication system, which may be utilized in connection with and embodiment of the invention.

FIG. 2 is a block diagram of an exemplary master and slave utilizing a Bluetooth communication system, which may be utilized in connection with and embodiment of the invention. Referring to FIG. 2, there is shown a DSP 200, a memory 201, a transmitter 202, and a slave device 203. The memory 201 may comprise suitable logic, circuitry, and/or code that may enable storing various lookup tables corresponding to characteristic of the various packets types, which may be utilized within Bluetooth. The transmitter 202 may comprise suitable logic, circuitry, and/or code that may enable the transmission of Bluetooth packets. In this regard, the power output of the transmitter 202 may be adjusted in response to the amount of RF power received at the slave device 203. In addition, the transmitter 202 may be capable of modulating data utilizing a plurality of modulation schemes, such as GFSK, $\pi/4$-DQPSK, and 8 DPSK.

The DSP 200 may comprise suitable logic, circuitry, and/or code that may enable the communication of Bluetooth packets. In this regard, the DSP 200 may be capable of arranging the packets so that they may be communicated utilizing a plurality of timeslot arrangements. For example, the packets may be distributed over, 1, 3 or 5 timeslots. The DSP 200 may further provide for error detection and correction by computing a CRC and appending the CRC at the end of a packet as well as by inserting redundancy into the packet so that detected errors may be corrected. In this regard, the DSP 200 may choose a packet type based on how well that packet type may perform under certain adverse conditions. For example, in a noisy environment a packet type with error correction may perform better than a packet without error correction. The determination of which type of packet may perform better may be based on certain empirical data. That data may be stored in the memory 201.

The DSP may also be capable of controlling the modulation scheme utilized by the transmitter 202. For example, the DSP may be capable of supporting GFSK, $\pi/4$-DQPSK, and 8 DPSK. The DSP may change the modulation in order to increase the amount of data throughput in a given time slot. In addition, the DSP may be capable of adjusting the transmit power utilized by the transmitter 202 to transmit the packets. The DSP may accomplish this by adjusting a bias voltage of a PA that may reside within the transmitter 202, for example. In this regard, adjustment of the power may be necessary to increase the signal to noise ratio.

Figure 3:
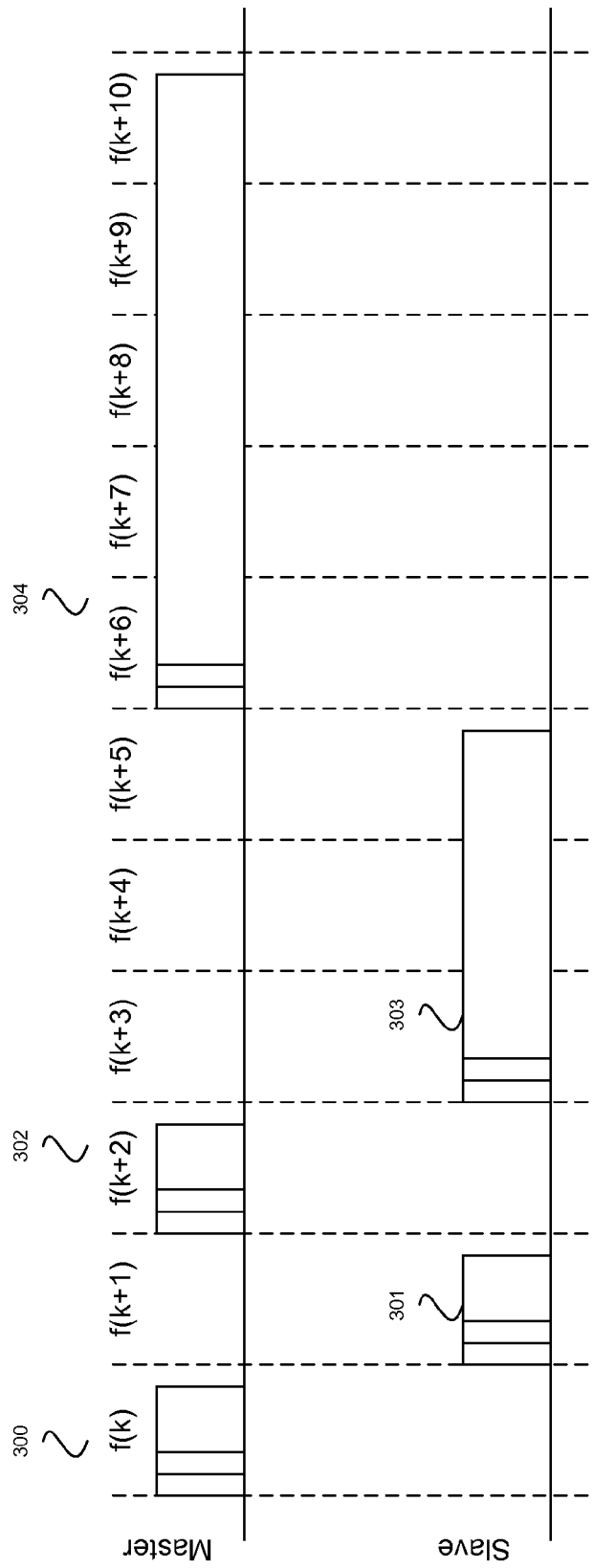
FIG. 3 is a block diagram of an exemplary timeslot arrangement for Bluetooth communication, which may be utilized in connection with an embodiment of the invention.

FIG. 3 is a block diagram of an exemplary timeslot arrangement for Bluetooth communication, which may be utilized in connection with an embodiment of the invention. Referring to FIG. 3, there is shown a single timeslot link 300, a 3 timeslot link 303 and a 5 timeslot link 304. The basic physical channel of a Bluetooth link may be divided into time slots. For example, each timeslot may be 625 µs in length. A time division duplex (TDD) scheme may be utilized where a master device and a slave device alternatively transmit information during timeslots. For example, a computer 101 may transmit data to a mobile device 100 during even timeslots and may receive data from the mobile device 100 during odd timeslots.

A single timeslot link 300, a may be utilized to communicate voice traffic between two devices. A single timeslot link 300 may also be utilized to communicate data between two devices. When an increase in throughput is required, multiple timeslots may be utilized. For example, two timeslots or 5 timeslots may be utilized. In this regard, a 3 timeslot link 303 may be capable of communicating 3 times the information that a single timeslot link 300 may communicate. A 5 timeslot link 304 may be capable of communicating 5 times the information that a single timeslot link 300 may communicate.

Communication between two devices may be synchronous or asynchronous. For synchronous communication, odd timeslots may be utilized to transmit information and even timeslots may be utilized to receive information. Synchronous channels may be utilized to minimize latency between a master device and a slave device. For example, where two users are speaking to one another over a Bluetooth link, latency may have to be minimized to produce a pleasing experience for the two users. As a result, error detection schemes may not be of much use. In other words, a device receiving an asynchronous channel, such as voice traffic, may not be capable of taking any action in the case of a bad packet. Therefore, it may be more efficient to utilize all the bits for the voice data itself.

Asynchronous communication may be utilized in situations where some amount of latency may be tolerated. For example, for data communication, the amount of time it takes for data to be communicated may not be critical. In this case, timeslots carrying data information may not occur at every other timeslot. Rather they may be spaced many timeslots apart. In this regard, a device communicating voice data and application data may give priority to the voice data and may utilize the left over slots for data traffic. Synchronous data packets may have additional coding that may allow for error detection and correction. For example, the packets may comprise a CRC bit pattern so that a receiving device may detect errors in packets. The packets may also be encoded utilizing a forward error correction scheme. This may facilitate correcting bit errors in the packets at a receiving device. Detection/Correction of packets may be needed to insure the integrity of the data at a receiving device and may be utilized by the receiving device to, for example, request a retransmission of a bad packet.

FIG. 4A is a block diagram of an exemplary basic data rate (BDR) packet, which may be utilized in connection with an embodiment of the invention. Referring to FIG. 4A, there is shown access code data bits 400, header data bits 401, and payload data bits 402. The access code data bits 400 may be utilized for synchronization, DC offset compensation, and identification. Every packet may start with an access code. If a packet header follows, the access code may be 72 bits long, otherwise the access code may be 68 bits long. The shortened access code may not contain a trailer and may be utilized for synchronization, DC offset compensation and identification. The access code may identify all packets exchanged on a physical channel and all packets sent in the same physical channel that may be preceded by the same access code. In the receiver of the device, a sliding correlator may correlate against the access code and trigger when a threshold is, for example, exceeded. This trigger signal may be utilized to determine the receive timing. The shortened access code may also be utilized for paging, inquiry, and park modes of operation. In this case, the access code itself may be utilized as a signaling message and neither a header nor a payload may be needed.

The header data bits 401 may be utilized to indicate the destination slave for a packet in a master-to-slave transmission slot and may also indicate the source slave for a slave-to-master transmission slot. The total packet header may comprise 18 bits. The header data bits 401 may be encoded with a rate 1/3 forward error correction (FEC) encoding scheme, where the bits within the header may be repeated 3 times. In the case of FEC encoding, the header size may be 54 bits.

The header data bits 401 may also comprise a flow control bit that may be utilized for flow control of packets over an asynchronous logical transport and an acknowledge indicator bit that may be utilized to inform a source of the successful transfer of payload data with CRC. The header data bits 401 may comprise and 8-bit word, which may be utilized to verify the integrity of the header.

The basic data rate payload data bits 402 may be utilized to communicate information from the upper layers of the Bluetooth protocol. The information may correspond to data for applications, such as an address book. The information may also correspond to voice information, which may be utilized by a Bluetooth headset, for example. The basic data rate payload data bits 402 may include error detection/correction information and may also be distributed over a plurality of time slots.

When the information to be communicated corresponds to data, various packets types may be utilized. These packet types may have different characteristics. For example, a DM1 packet may carry between 1 and 18 information bytes (including the 1-byte payload header) plus a 16-bit CRC code. The DM1 packet may occupy a single time slot. The information plus the CRC bits may be coded with a rate 2/3 forward error correction (FEC). The payload header in the DM1 packet may be 1 byte long. A DH1 packet may be similar to the DM1 packet, except that the information in the payload may not be FEC encoded. As a result, the DH1 packet may have between 1 and 28 information bytes (including the 1-byte payload header) plus a 16-bit CRC code.

A DM3 packet may occupy up to three time slots and may carry between 2 and 123 information bytes (including the 2-byte payload header) plus a 16-bit CRC code. The information plus CRC bits may be coded with a rate 2/3 FEC. The payload header in the DM3 packet may be 2 bytes long. A DH3 packet may be similar to the DM3 packet, except that the information in the payload may not be FEC encoded. As a result, the DH3 packet may have between 2 and 185 information bytes (including the 2-byte payload header) plus a 16-bit CRC code.

A DM5 packet may occupy up to five time slots and may carry between 2 and 226 information bytes (including the 2-byte payload header) plus a 16-bit CRC code. The payload header in the DM5 packet may be 2 bytes long. The information plus CRC bits may be coded with a rate 2/3 FEC. A DH5 packet may be similar to the DM5 packet, except that the information in the payload may not be FEC encoded. As a result, the DH5 packet may have between 2 and 341 information bytes (including the 2-byte payload header) plus a 16-bit CRC code. Table 1 below summarizes the differences between the various basic rate data packet types.

TABLE 1

| Packet Type | FEC | CRC | Timeslots |
| --- | --- | --- | --- |
| DM1 | rate 2/3 | Yes | 1 |
| DM3 | rate 2/3 | Yes | 3 |
| DM5 | rate 2/3 | Yes | 5 |
| DH1 | none | Yes | 1 |
| DH2 | none | Yes | 3 |
| DH5 | none | Yes | 5 |

When the information to be communicated corresponds to voice data various packets types may be utilized. These packet types may have different characteristics. For example, an HV1 packet may carry 10 information bytes. The bytes may be protected with a rate 1/3 FEC, no CRC may be present, and the payload length may be fixed at 240 bits. An HV2 packet may carry 20 information bytes. The bytes may be protected with a rate 2/3 FEC, no CRC may be present, and the payload length may be fixed at 240 bits. An HV3 packet may carry 30 information bytes. The bytes may not be protected by FEC, no CRC may be present, and the payload length may be fixed at 240 bits. Table 2 below summarizes the differences between the various basic rate voice data packet types.

TABLE 2

| Packet Type | FEC | CRC | Information bytes |
| --- | --- | --- | --- |
| HV1 | rate 1/3 | none | 10 |
| Packet Type | FEC | CRC | Information bytes |
| HV3 | rate 2/3 | none | 20 |
| HV5 | none | none | 30 |

FIG. 4B is a block diagram of an exemplary extended data rate packet, which may be utilized in connection with an embodiment of the invention. Referring to FIG. 4B, there is shown access code data bits 403, header data bits 404, and enhanced data rate payload bits 405. The access code data bits 403 may be utilized for synchronization, DC offset compensation, and identification. Every packet may start with an access code. If a packet header follows, the access code may be 72 bits long, otherwise the access code may be 68 bits long. The shortened access code may not contain a trailer and may be utilized for synchronization, DC offset compensation and identification. The access code may identify all packets exchanged on a physical channel and packets sent in the same physical channel that may be preceded by the same access code. In the receiver of the device, a sliding correlator may correlate against the access code and trigger when a threshold is, for example, exceeded. This trigger signal may be utilized to determine the receive timing. The shortened access code may also be utilized for paging, inquiry, and park modes of operation. In this case, the access code itself may be utilized as a signaling message and neither a header nor a payload may be needed.

The header data bits 404 may be utilized to indicate the destination slave for a packet in a master-to-slave transmission slot and may also indicate the source slave for a slave-to-master transmission slot. The total packet header may comprise 18 bits. The header data bits 404 may be encoded with a rate 1/3 forward error correction (FEC) encoding scheme, where the bits within the header may be repeated 3 times. In the case of FEC encoding, the header size may be 54 bits.

The header data bits 404 may also comprise a flow control bit that may be utilized for flow control of packets over a asynchronous logical transport and an acknowledge indicator bit that may be utilized to inform a source of the successful transfer of payload data with CRC. The header data bits 404 may comprise and 8-bit word, which may be utilized to verify the integrity of the header.

The enhanced data rate payload bits 405 may be utilized to communicate information from the upper layers of the Bluetooth protocol. The information may correspond to data for applications, such as an address book. The payload data bits may include error detection/correction information and may also be distributed over a plurality of time slots. The enhanced data rate payload bits 405 may be modulated utilizing $\pi/4$-DQPSK or 8 DPSK rather than GFSK. In this regard, the enhanced data rate payload bits 405 may be capable of carrying 2 or 4 times the amount information that the basic data rate payload bits 402 described above may carry.

When the information to be communicated corresponds to data, various packets types may be utilized. These packet types may have different characteristics. For example, a 2-DH1 packet may be similar to the DH1 packet described above except that the payload may be modulated utilizing $\pi/4$-DQPSK. The 2-DH1 packet may carry between 2 and 56 information bytes (including the 2-byte payload header) plus a 16-bit CRC code. A 2-DH3 packet may be similar to the DH3 packet described above except that the payload may be modulated utilizing $\pi/4$-DQPSK. A 2-DH3 packet may carry between 2 and 369 information bytes (including the 2-byte payload header) plus a 16-bit CRC code. A 2-DH5 packet may be similar to the DH5 packet described above except that the payload may be modulated utilizing $\pi/4$-DQPSK. The 2-DH5 packet may carry between 2 and 681 information bytes (including the 2-byte payload header) plus a 16-bit CRC code.

A 3-DH1 packet may be similar to the DH1 packet described above except that the payload may be modulated utilizing 8 GFSK. The 3-DH1 packet may carry between 2 and 85 information bytes (including the 2-byte payload header) plus a 16-bit CRC code. A 3-DH3 packet may be similar to the DH3 packet described above except that the payload may be modulated using 8 GFSK. The 3-DH3 packet may carry between 2 and 554 information bytes (including the 2-byte payload header) plus a 16-bit CRC code. A 3-DH5 packet may be similar to the DH5 packet described above except that the payload may be modulated utilizing 8 GFSK. The 3-DH5 packet may carry between 2 and 1023 information bytes (including the 2-byte payload header) plus a 16-bit CRC code. Table 3 below summarizes the differences between the various basic rate data packet types.

TABLE 3

| Packet Type | Modulation type | CRC | Timeslots |
|---|---|---|---|
| 2-DH1 | $\pi/4$-DQPSK | Yes | 1 |
| 2-DH3 | $\pi/4$-DQPSK | Yes | 3 |
| 2-DH5 | $\pi/4$-DQPSK | Yes | 5 |
| 3-DH1 | 8GFSK | Yes | 1 |
| 3-DH2 | 8GFSK | Yes | 3 |
| 3-DH5 | 8GFSK | Yes | 5 |

Figure 5A:
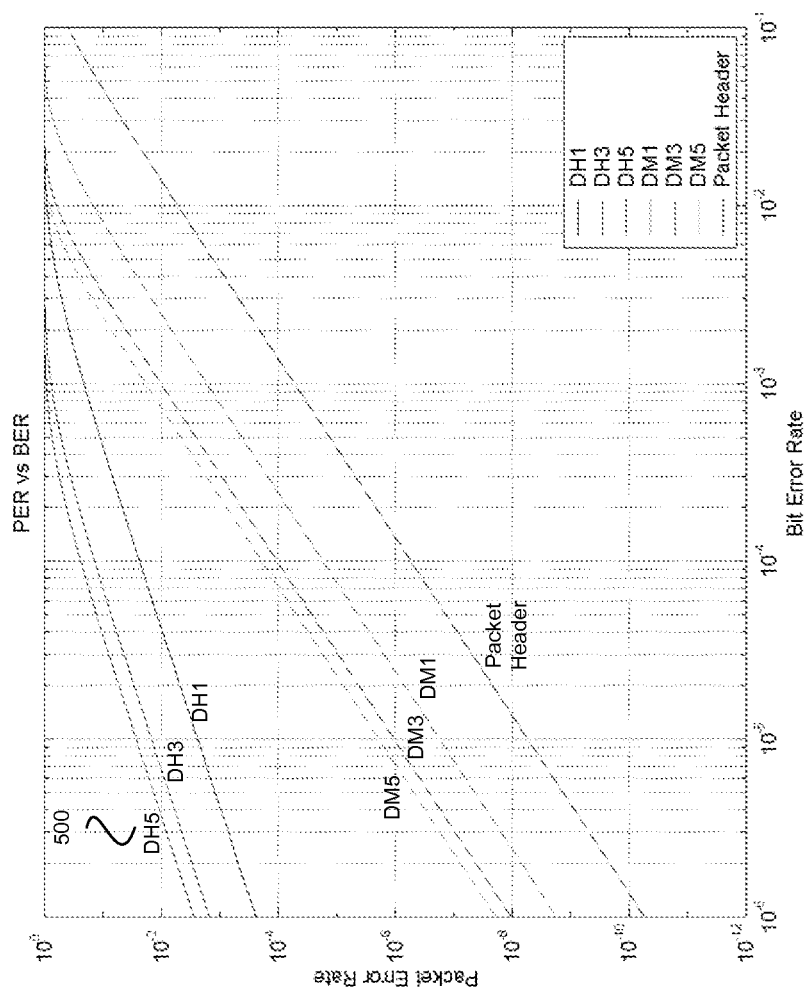
FIG. 5A is a diagram of an exemplary graph illustrating the relationship between packet error rate and bit error rate (PER vs. BER) for several basic rate data packets, in accordance with an embodiment of the invention.

FIG. 5A is a diagram of an exemplary graph illustrating the relationship between packet error rate and bit error rate (PER vs. BER) for several basic rate data packets, in accordance with an embodiment of the invention. Referring to FIG. 5A, there are shown PER vs. BER curves for various basic rate packet types 500. As shown in FIG. 5A, for a given BER, the packet error rate for a header packet may be the lowest. The next lowest packet error rate may correspond to a DM 1 packet, followed by a DM2, DM3, DH1, DH2, and DH3 packets.

The PER may be measured, for example, by using counters to compare the number of packets received where the CRC passes with the number of packets received where the CRC failed. A bad header may also be considered a bad packet. Once the PER has been determined, the BER may be determined by utilizing the chart in FIG. 4A.

Figure 5B:
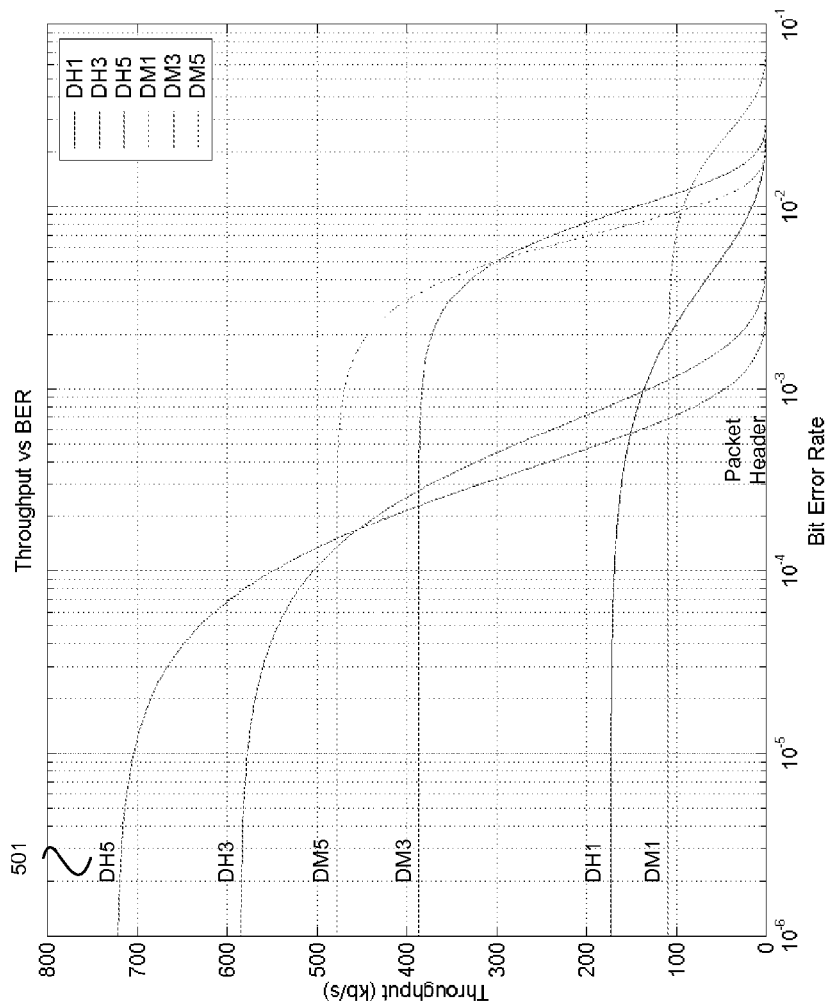
FIG. 5B is a diagram of an exemplary graph illustrating the relationship between throughput and BER for several basic rate data packets, in accordance with an embodiment of the invention.

FIG. 5B is a diagram of an exemplary graph illustrating the relationship between throughput and BER for several basic rate data packets, in accordance with an embodiment of the invention. Referring to FIG. 5B, there are shown throughput vs. BER curves for various basic rate packet types 501. As shown in FIG. 5B, for a very low BER, the DH5 packet type may yield the highest throughput. As the BER increases, the throughput of the DH5 may decrease. When the BER increases to approximately 9E-3, the DM5 packet type may yield a higher throughput than the DH5 packet type. For example, when the BER increases to approximately 6E-2, the DM3 packet type may yield a higher throughput than the DM5 packet type. When the BER increases to approximately 1E-2, for example, the DM1 packet type may yield a higher throughput than the DM3 packet type.

Figure 5C:
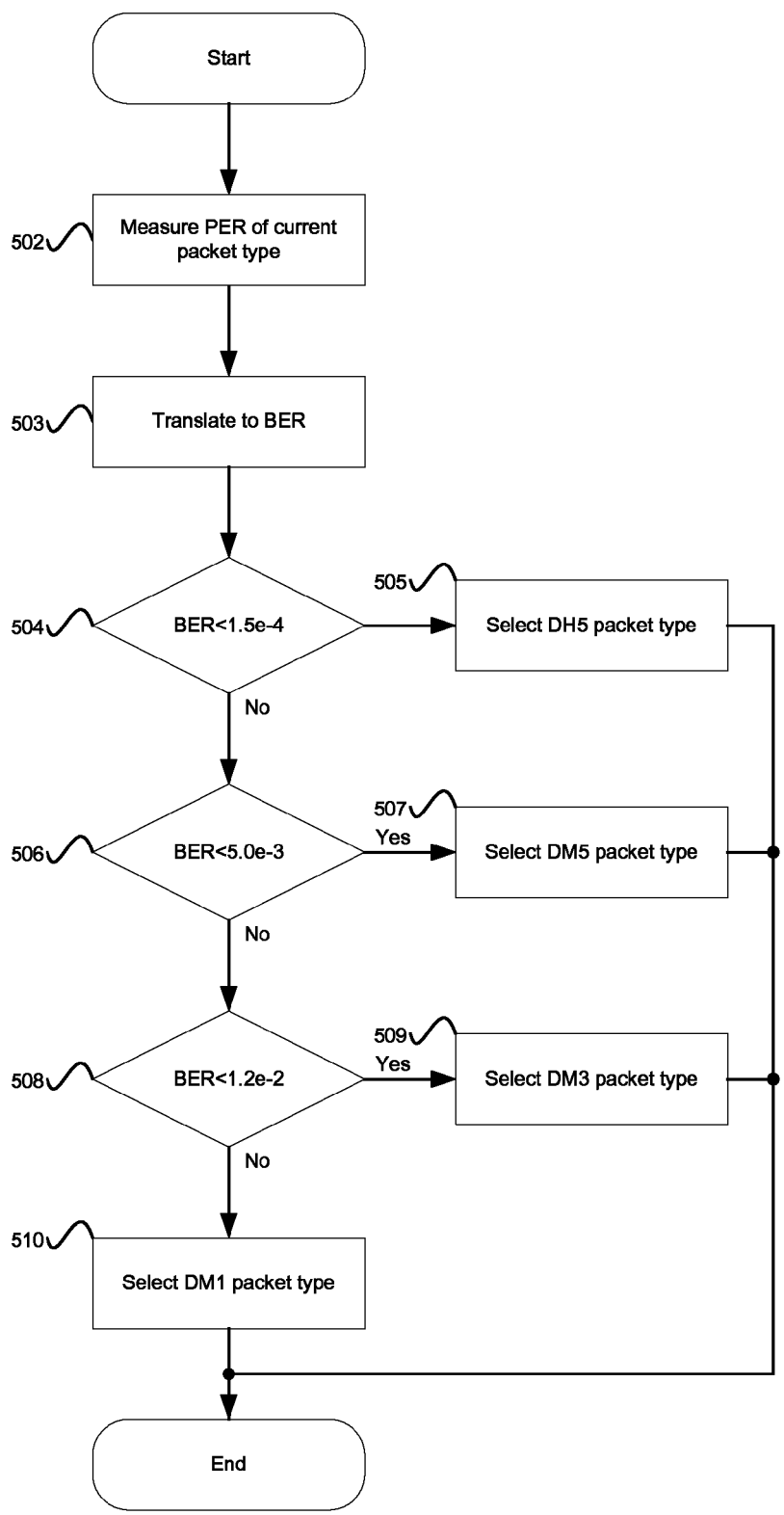
FIG. 5C is a block diagram of an exemplary flow chart for selecting a basic rate packet type to maximize throughput, in accordance with an embodiment of the invention.

FIG. 5C is a block diagram of an exemplary flow chart for selecting a basic rate packet type to maximize throughput, in accordance with an embodiment of the invention. Referring to FIG. 5C, at step 502, the PER of the currently utilized packet type may be determined by utilizing, for example, the CRC within a data or header packet to determine whether the packet has passed or failed. At step 503, the PER may be converted into a BER. This may be accomplished via the chart shown in FIG. 5A. In this regard, the various data points representing the curves shown in FIG. 5A may be stored in a memory 201. The data may be arranged, for example, as a 2-dimensional array where PER may be one dimension in the array and the packet type may be the other dimension in the array, and the elements of the array may be the BER.

At step 504, if the BER is less than 1.5e-4, the DH5 packet type may be selected at step 505. If the BER is greater than 1.5e-4, then at step 506, if the BER is less than 5.0e-3, the DM5 packet type may be selected at step 507. If the BER is greater than 5.0e-3, then at step 508, if the BER is less than 1.2e-2, the DM3 packet type may be selected at step 509. If the BER is greater than 1.2e-2, then at step 510, the DM1 packet type may be selected. This process may yield the optimal data throughput for a given BER.

Figure 6A:
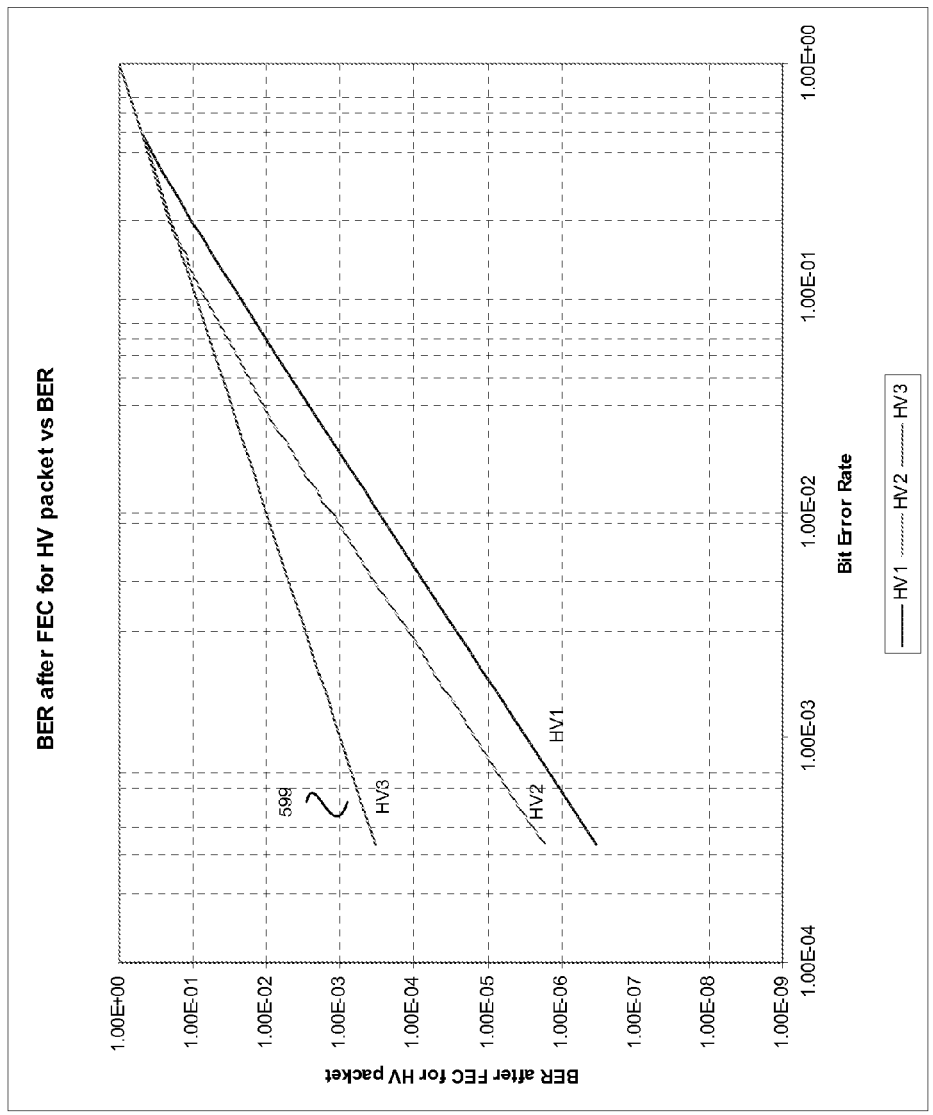
FIG. 6A is a diagram of an exemplary graph illustrating the relationship between the BER before forward error correction (FEC) and after forward error correction for various voice packets, in accordance with an embodiment of the invention.

FIG. 6A is a diagram of an exemplary graph illustrating the relationship between the BER before forward error correction (FEC) and after forward error correction for various voice packets, in accordance with an embodiment of the invention. Referring to FIG. 6A, there are shown raw BER vs. BER after FEC curves for various basic rate packet types 599. It may be shown that satisfactory voice quality may be achieved when the BER after FEC is, for example, below 1e-3. As shown in FIG. 6A, the HV3 packet type may yield a BER after FEC of 1e-3 or less when the raw BER is less than 1e-3. The HV2 packet type may yield a BER after FEC of 1e-3 or less when the raw BER is less than 9e-3.

The HV1 packet type may yield a BER after FEC of 1e-3 or less when the raw BER is less than 2e-2. Because the HV3 packet type carries more information than the HV2 or HV1 packet types, if may be desirable to utilized this packet type when the raw BER is relatively low. As the raw BER becomes worse, it may become more desirable to use either HV2 packet and then eventually the HV1 packet.

Figure 6B:
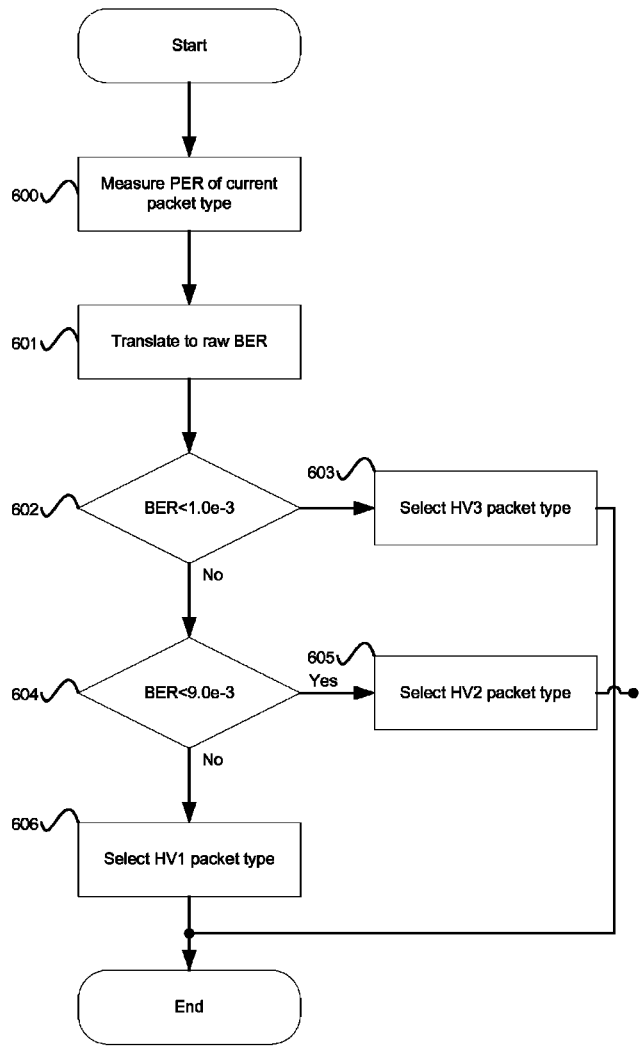
FIG. 6B is a block diagram of an exemplary flow chart for selecting the optimal voice packet type, in accordance with an embodiment of the invention.

FIG. 6B is a diagram of an exemplary flow graph for selecting the optimal voice packet type, in accordance with an embodiment of the invention. Referring to FIG. 6B, at step 600 the PER of the currently utilized data packet type may be determine by utilizing, for example, the CRC within a data packet to determine whether the packet has passed or failed. At step 601, the PER may be converted into a raw BER. This may be accomplished via the chart shown in FIG. 5A as described above.

At step 602, if the BER is less than 1e-5, the HV3 packet type may be selected at step 603. If the BER is greater than 1e-5, then at step 604, if the BER is less than 9e-3 the HV2 packet type may be selected at step 605. If the BER is greater than 9e-3, then at step 606, the HV1 packet type may be selected at step 707. This process may yield the optimal voice quality for a given raw BER.

Figure 7A:
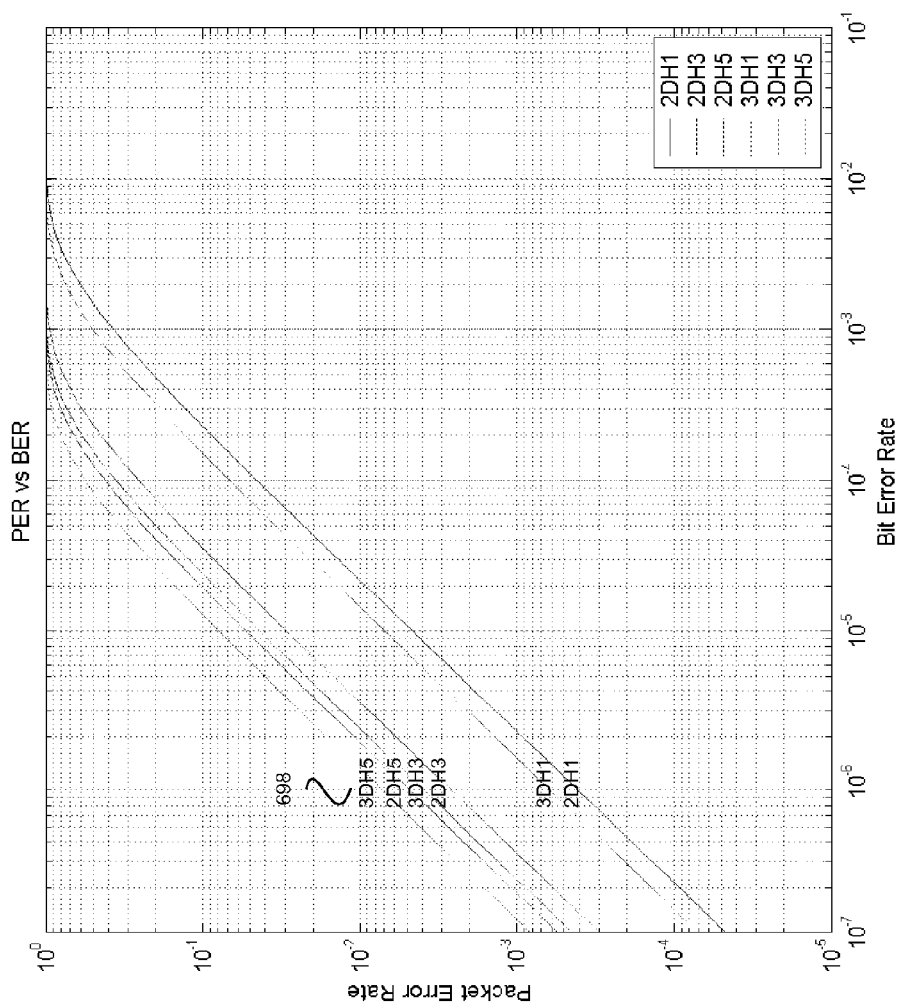
FIG. 7A is a diagram of an exemplary graph illustrating packet error rate vs. bit error rate (PER vs. BER) for several enhanced data rate (EDR) packets, in accordance with an embodiment of the invention.

FIG. 7A is a diagram of an exemplary graph illustrating packet error rate vs. bit error rate (PER vs. BER) for several enhanced data rate (EDR) packets, in accordance with an embodiment of the invention. Referring to FIG. 7A, there are shown PER vs. BER curves for various enhanced data rate packet types 698. As shown in FIG. 7A, for a given BER, the packet error rate for a 2DH1 packet may be the lowest. The next lowest packet error rate may correspond to a 3DH1, followed by a 2DH3, 3DH3, 2DH5, and 3DH5 packets.

PER may be measured, for example, by using counters to compare the number of packets received where the CRC passes with the number of packets received where the CRC failed. A bad header may also be considered a bad packet. Once the PER has been determined, the BER may be determined by utilizing the chart in FIG. 7A.

In order to determine the BER for a given packet type, there may need to be a measurable amount of packet error. For a given signal to noise ratio (SNR), it may be the case that the PER is, for example, low or zero for a packet modulated utilizing QPSK modulation, such as 2DH1, 2DH3, and 2DH5, while at the same time there may be a measurable PER for packets modulated utilizing 8 GFSK, such as 3DH1, 3DH3, and 3DH5. Therefore, other measurements, such as received signal strength (RSSI), mean phase error of a received signal, and the amplitude error of the received signal, may be utilized to help determine when to make the switch between QPSK and 8 DSPK mode.

Figure 7B:
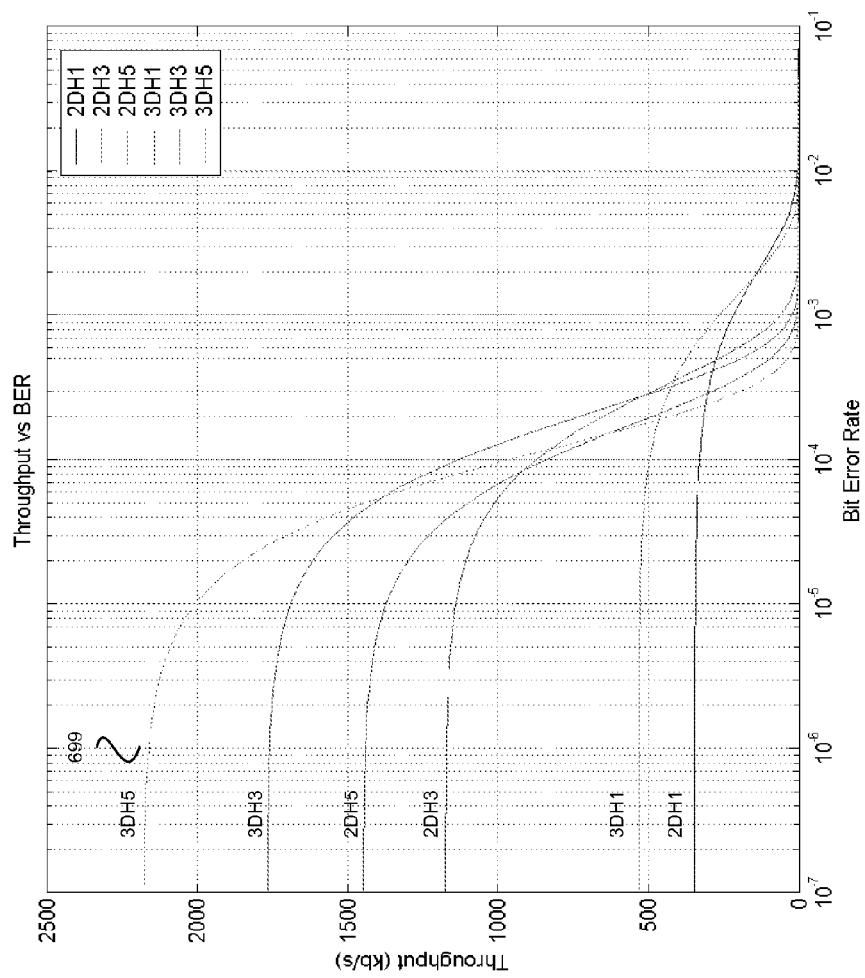
FIG. 7B is a diagram of an exemplary graph illustrating the relationship between throughput and BER for several enhanced data rate packets, in accordance with an embodiment of the invention.

FIG. 7B is a diagram of an exemplary graph illustrating the relationship between throughput and BER for several enhanced data rate packets, in accordance with an embodiment of the invention. Referring to FIG. 7B, there are shown throughput vs. BER curves for various enhanced data rate packet types 699. As shown in FIG. 7B, for a very low BER, the 3DH5 packet type yields the highest throughput. As the BER increase, the throughput of the 3DH5 may decrease. When the BER increases to approximately 5.5e-5, the 3DH3 packet type may yield a higher throughput than the 3DH5 packet type. When the BER increases to approximately 2.5e-4, the 3DH3 packet type may yield a higher throughput than the 3DH5 packet type. When the BER increases to approximately 3.5e-4, the 2DH3 packet type may yield a higher throughput than the 3DH3 packet type. When the BER increases to approximately 1.8e-3, the 3DH1 packet type may yield a higher throughput than the 2DH3 packet type. When the BER is greater than 1.8e-3, the 2DH1 packet type may yield a higher throughput than the 3DH1 packet type.

Figure 7C:
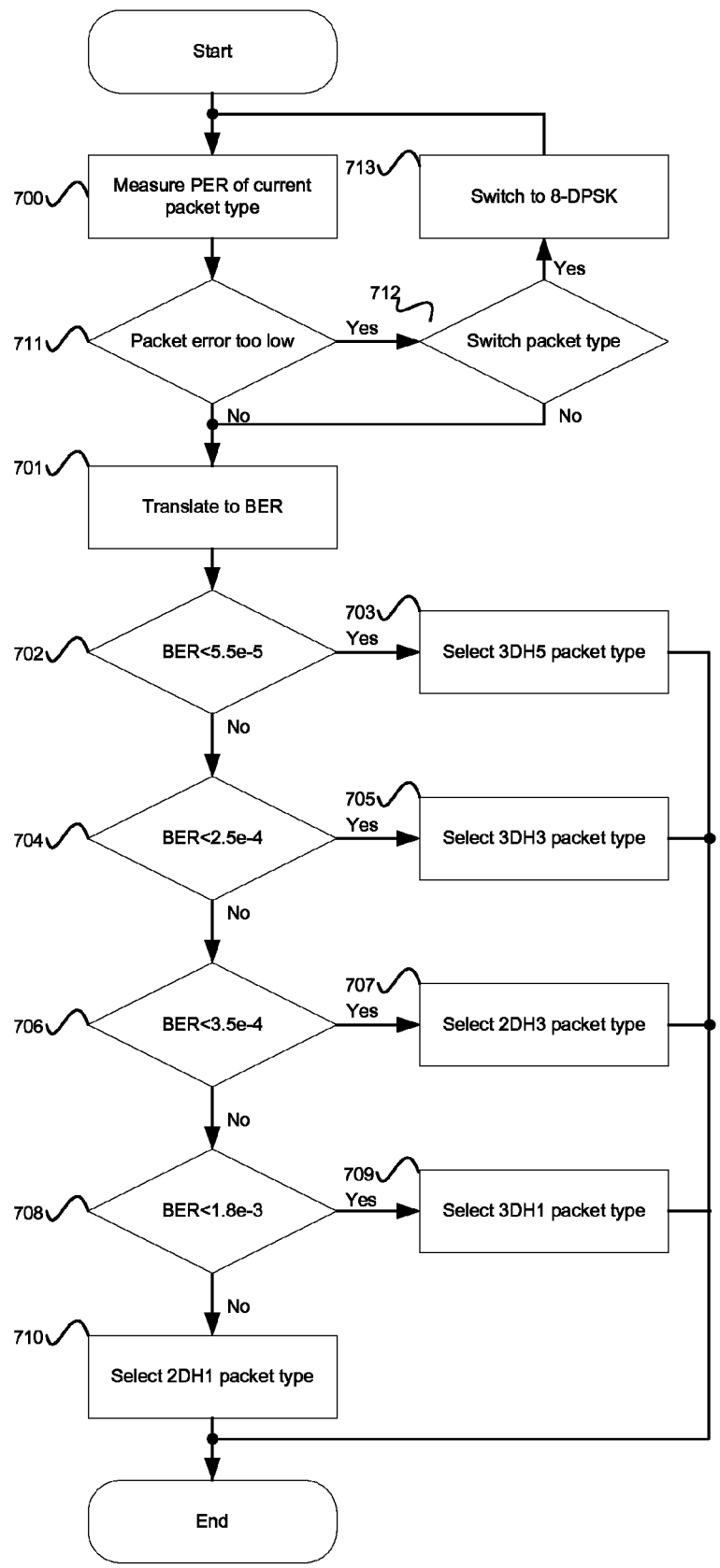
FIG. 7C is a block diagram of an exemplary flow chart for selecting a packet type to maximize throughput, in accordance with an embodiment of the invention.

FIG. 7C is a block diagram of an exemplary flow chart for selecting a packet type to maximize throughput, in accordance with an embodiment of the invention. Referring to FIG. 7C, at step 700, the PER of the currently utilized packet type may be determined by utilizing, for example, the CRC within a data packet to determine whether the packet has passed or failed. At step 711, if the packer error is too low and the packet type is π/4-DQPSK, then at step 712 other measurements, such as received signal strength (RSSI), mean phase error of a received signal, and the amplitude error of the received signal, may be utilized to determine whether to make the switch between π/4-DQPSK and 8 DPSK. If the value of the BER is within a range that is suitable for communication utilizing an 8 DPSK packet, then at step 713, an 8 DPSK packet may be utilized to communicate the next packet and the process may go back to step 700. Otherwise the process may go to step 701.

Referring back to step 711, if there exists a measurable PER, then at step 701, the PER may be converted into a BER. This may be accomplished via the chart shown in FIG. 7A. In this regard, the various data points representing the curves shown in FIG. 7A may be stored in the memory 201. The data may be arranged, for example, as a 2-dimensional array where the PER may be one dimension in the array and the packet type may be the other dimension in the array, and the elements of the array may be the BER.

At step 702, if the BER is less than 5.5e-5, the 3DH5 packet type may be selected at step 703. If the BER is greater than 5.5e-5, then at step 704, if the BER is less than 2.5e-4 the 3DH3 packet type may be selected at step 705. If the BER is greater than 2.5e-4, then at step 706, if the BER is less than 3.5e-4, the 2DH3 packet type may be selected at step 707. If the BER is greater than 3.5e-4, then at step 708, if the BER is less than 1.8e-3, the 3DH1 packet type may be selected at step 709. If the BER is greater than 1.8e-3, then at step 710, the 2DH1 packet type may be selected. This process may yield the optimal data throughput for a given BER.

Figure 8:
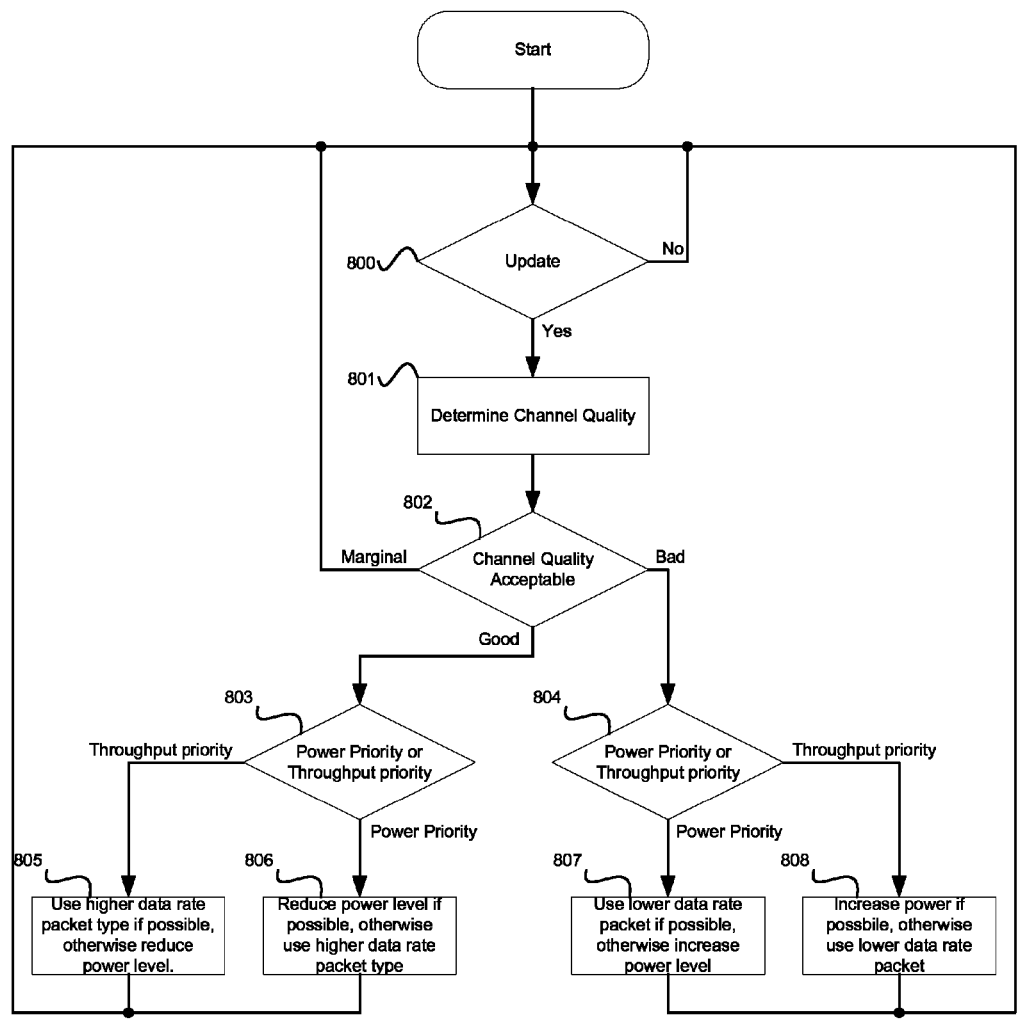
FIG. 8 is a block diagram of an exemplary flow chart for maximizing data throughput by selecting a packet type and/or adjusting the transmit power level, in accordance with an embodiment of the invention

FIG. 8 is a block diagram of an exemplary flow chart for maximizing data throughput by selecting a packet type and/or adjusting the transmit power level, in accordance with an embodiment of the invention. Referring to FIG. 8, at step 800, some time may pass before updating the power and/or packet type. At step 801, the channel quality may be measured. In this regard, metrics such as PER, RSSI, phase error and amplitude error may be evaluated.

At step 802, a determination may be made as to whether any adjustments may be needed. For example, if the channel quality is bad, then at step 804, if reducing power consumption is more important than increasing throughput, then at step 807, a packet type with a lower throughput may be chosen if one exists. If no lower packet throughput packet type exist, then the power level may have to be increased to improve the channel quality. Referring back to step 804, if throughput is a priority, then at step 808, the power level may be increased. If the power level is at a maximum level and the channel quality is still bad, then a lower throughput packet type may be selected. After any adjustments have been made, the process may go back to step 800.

Referring back to 802, if the channel quality is good, then at step 803, a determination may be made as to whether a packet type with a higher throughput may be utilized. If this is the case, then at step 806, the steps described in the FIG. 5C, FIG. 6B, and FIG. 7C may be utilized to find the packet type that will provide the greatest throughput. If the highest data rate packet is already being utilized, then at step 805 the transmit power may be decreased thereby minimizing the power consumption necessary to support the current packet type. After any adjustments have been made, the process may go back to step 800.

Referring back to 802, if the channel quality is marginal, then no adjustment may be needed. In this regard, the system may try to optimize the power consumption and data throughput to achieve a marginal channel quality. For example, if the channel quality is bad, changes in the power level and/or packet type may be made continually until the channel quality changes from bad to marginal. If the channel quality is good, similar changes to the power level and/or packet type may be made continually until the channel quality changes from good to bad. In this manner, the data throughput and power consumption may be optimized.

Another embodiment of the invention may provide a method for performing the steps as described herein for optimizing data throughput in a Bluetooth communication system. For example, the system shown in FIG. 2 may be configured to determine the bit error rate of a Bluetooth packet that conforms to a first Bluetooth packet type transmitted at a first power output level of a Bluetooth transmitter 202 and based on the bit error rate select a second Bluetooth packet type so as to bring the signal quality to a nominal level. For example, when the signal quality is good and the current Bluetooth packet type is the packet type that provides the highest throughput, the output power level of the transmitter 202 may be lowered until the signal quality becomes nominal. When the signal quality is good and the output power level of the transmitter 202 is at the minimum level, Bluetooth packets providing higher and higher data rates may be selected until the signal quality becomes nominal. When the signal quality is bad and the current Bluetooth packet type is the packet type that provides the lowest throughput, the output power level of the transmitter 202 may be increased until the signal quality becomes nominal. When the signal quality is bad and the output power level of the transmitter 202 is at the maximum level, Bluetooth packets providing lower and lower data rates may be selected until the signal quality becomes nominal.

The different packet types may comprise DM1, DM3, DM5, DH1, DH3, DH5 (500 and 501), HV1, HV2, HV3 599, 2DH1, 2DH3, 2DH5, 3DH1, 3DH3, and 3DH5 (698 and 699) Bluetooth packets. The bit error rate may be derived from the packet error rate of the currently utilized packet type by using the graphs in FIG. 5A, FIG. 5B, FIG. 6A, FIG. 7A, FIG. 7B. The packet error rate may be computed by comparing the number of packets with good CRCs to the number of packets with bad CRCs. The bit error rate may also be estimated by evaluating other signal parameters, such as RSSI, Amplitude error, and Phase error.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   determining, by a Bluetooth transceiver, a channel quality of a Bluetooth channel based at least in part upon a measured packet error rate of Bluetooth packets communicated via the Bluetooth channel, the Bluetooth packets having a first packet type of a plurality of packet types; and
   responsive to the channel quality, selecting, by the Bluetooth transceiver, a second packet type of the plurality of packet types based at least in part upon a bit error rate determined from the measured packet error rate.

2. The method of claim 1, comprising communicating, by the Bluetooth transceiver, Bluetooth packets of the second packet type via the Bluetooth channel.

3. The method of claim 1, comprising switching data modulation of the Bluetooth packets based at least in part the channel quality, wherein the second packet type corresponds to the switched data modulation.

4. The method of claim 3, wherein the data modulation is switched in response to a comparison of the measured packet error rate and a predefined threshold.

5. The method of claim 1, wherein the second packet type is further based upon a performance priority associated with the Bluetooth channel.

6. The method of claim 5, wherein the performance priority is a throughput priority or a power priority.

7. The method of claim 1, wherein the bit error rate determined from the measured packet error rate accounts for forward error correction of the Bluetooth packets.

8. The method of claim 1, wherein the bit error rate is determined from the packet error rate based upon a predefined relationship between the packet error rate and the bit error rate.

9. A mobile communication device, comprising:
a Bluetooth transmitter and a Bluetooth receiver configured to communicate Bluetooth packets with another Bluetooth device via a Bluetooth channel;
processing circuitry configured to determine a channel quality based at least in part upon a measured packet error rate of Bluetooth packets communicated via the Bluetooth channel, the Bluetooth packets having a first packet type of a plurality of packet types; and
the processing circuitry further configured to select, in response to the channel quality, a second packet type of the plurality of packet types based at least in part upon a bit error rate determined from the measured packet error rate.

10. The mobile communication device of claim 9, wherein the Bluetooth transmitter supports a plurality of data modulation schemes.

11. The mobile communication device of claim 10, wherein data modulation of the Bluetooth packets is switched based at least in part the channel quality, the second packet type corresponding to the switched data modulation.

12. The mobile communication device of claim 9, wherein the channel quality is further based upon received signal strength (RSSI), amplitude error, or phase error.

13. The mobile communication device of claim 9, wherein the processing circuitry comprises a digital signal processor and memory.

14. The mobile communication device of claim 13, wherein the memory stores a predefined relationship between the packet error rate and the bit error rate.

15. The mobile communication device of claim 9, wherein the mobile communication device is a master device and the other Bluetooth device is a slave device.

16. A non-transitory machine-readable storage having stored thereon a program having at least one program section for processing signals in a communication system, the at least one program section being executable by a processing circuit for causing the processing circuit to:
determine a channel quality of a Bluetooth channel based at least in part upon a measured packet error rate of Bluetooth packets communicated via the Bluetooth channel, the Bluetooth packets having a first packet type of a plurality of packet types; and
responsive to the channel quality, select a second packet type of the plurality of packet types based at least in part upon a bit error rate determined from the measured packet error rate.

17. The non-transitory machine-readable storage of claim 16, wherein the channel quality is classified as good, marginal or bad.

18. The non-transitory machine-readable storage of claim 17, wherein the second packet type supports a lower data rate than the first packet type if the channel quality is bad.

19. The non-transitory machine-readable storage of claim 17, wherein the second packet type supports a higher data rate than the first packet type if the channel quality is good.

20. The non-transitory machine-readable storage of claim 16, wherein the plurality of packet types comprises HV1, HV2, HV3, 2DH1, 2DH3, 2DH5, 3DH1, 3DH3, and 3DH5 Bluetooth packets.

* * * * *